US011772464B2

(12) United States Patent
Endo et al.

(10) Patent No.: US 11,772,464 B2
(45) Date of Patent: Oct. 3, 2023

(54) DOOR STRUCTURE AND METHOD OF ASSEMBLING VEHICLE DOOR (71) Applicant: HONDA MOTOR CO., LTD., Tokyo (JP)

(72) Inventors: Satoshi Endo, Tokyo (JP); Yoshimitsu Iida, Tokyo (JP); Yuta Orikasa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 17/484,148

(22) Filed: Sep. 24, 2021

(65) Prior Publication Data
US 2022/0097500 A1 Mar. 31, 2022

(30) Foreign Application Priority Data
Sep. 29, 2020 (JP) ................................. 2020-163554

(51) Int. Cl.
B60J 5/04 (2006.01)
(52) U.S. Cl.
CPC ................... B60J 5/0468 (2013.01)
(58) Field of Classification Search
CPC ....... B60J 5/0468; B60J 5/0418; B60J 5/0469
See application file for complete search history.

(56) References Cited

U.S. PATENT DOCUMENTS

| 3,661,410 | A | * | 5/1972 | Larson ................ E05B 65/0817 |
| | | | | 52/582.2 |
| 6,035,601 | A | * | 3/2000 | Yamaguchi ......... B60R 13/0206 |
| | | | | 52/784.16 |
| 6,571,515 | B1 | * | 6/2003 | Samways ............... B60J 5/0416 |
| | | | | 49/502 |
| 7,108,313 | B2 | * | 9/2006 | Forrester ............. B60R 13/0243 |
| | | | | 296/146.7 |
| 7,743,559 | B2 | * | 6/2010 | Papi ...................... B60J 5/0416 |
| | | | | 49/502 |
| 10,471,809 | B2 | * | 11/2019 | Colosseo ............... B60J 5/0431 |
| 10,479,176 | B2 | * | 11/2019 | Yamashita ................ B32B 7/12 |
| 10,518,613 | B2 | * | 12/2019 | Dewasurendra ....... B60J 5/0468 |
| 11,446,988 | B2 | * | 9/2022 | Fortin .................... B60J 5/0413 |

(Continued)

FOREIGN PATENT DOCUMENTS

| EP | 1586474 | A2 | * | 10/2005 | ........... B60J 5/0416 |
| JP | S63-58079 | U | | 4/1988 | |

(Continued)

OTHER PUBLICATIONS

Office Action received in corresponding Japanese application No. 2020-163554 dated Jun. 7, 2022 with English translation (10 pages).

Primary Examiner — Marcus Menezes
(74) Attorney, Agent, or Firm — Rankin, Hill & Clark LLP (57) ABSTRACT A door structure includes an inner panel disposed closer to an inner side of a vehicle than an outer panel of a vehicle door and having an opening, and a cover member for covering the opening. A peripheral edge portion of the cover member is disposed closer to an outer side of the vehicle than a peripheral edge portion of the opening and overlaps the peripheral edge portion of the opening of the inner panel in an interior-to-exterior direction of the vehicle while contacting the peripheral edge portion of the opening.

4 Claims, 7 Drawing Sheets (56) References Cited

U.S. PATENT DOCUMENTS

| | | | |
|---|---|---|---|
| 2007/0086609 A1 | 4/2007 | Gomi | |
| 2008/0022602 A1 | 1/2008 | Senoo | |
| 2008/0246309 A1* | 10/2008 | Abe | B60J 5/0451 |
| | | | 296/187.05 |
| 2010/0109379 A1 | 5/2010 | Abe | |
| 2014/0065371 A1* | 3/2014 | Kopf | B60J 5/0418 |
| | | | 428/157 |
| 2015/0202949 A1* | 7/2015 | Ogino | B60R 13/0206 |
| | | | 49/465 |
| 2020/0353800 A1* | 11/2020 | Nakano | F16B 5/004 |
| 2021/0070154 A1* | 3/2021 | Oda | B60J 5/0418 |
| 2021/0284248 A1* | 9/2021 | Kiyota | B62D 29/04 |
| 2021/0300161 A1* | 9/2021 | Fortin | B32B 7/09 |
| 2022/0097500 A1* | 3/2022 | Endo | B60J 5/0468 |

FOREIGN PATENT DOCUMENTS

| | | |
|---|---|---|
| JP | H09-169214 A | 6/1997 |
| JP | 2004-262306 A | 9/2004 |
| JP | 2007-106280 A | 4/2007 |
| JP | 2007-314319 A | 12/2007 |
| JP | 2008-030514 A | 2/2008 |
| JP | 2008-254635 A | 10/2008 |
| JP | 2011-051449 A | 3/2011 |
| JP | 2013-256184 A | 12/2013 |
| JP | 2019-010951 A | 1/2019 |
| JP | 2019-099031 A | 6/2019 |
| WO | WO-2019136048 A1 * | 7/2019 ............ B60J 5/0434 |

* cited by examiner

FIG. 5A
(BEFORE FIXING WITH CLIP)

FIG. 5B
(AFTER FIXING WITH CLIP)

(D1>D2)

FIG. 6A
(BEFORE FIXING WITH CLIP)

FIG. 6B
(AFTER FIXING WITH CLIP)

DOOR STRUCTURE AND METHOD OF ASSEMBLING VEHICLE DOOR

CROSS-REFERENCE TO RELATED APPLICATION

This application claims the benefit of foreign priority to Japanese Patent Application No. 2020-163554, filed on Sep. 29, 2020, which is incorporated by reference in its entirety.

TECHNICAL FIELD

The present invention relates to a door structure comprising an inner panel disposed closer to an inner side (cabin) of a vehicle than an outer panel of a vehicle door and having an opening, and a cover member for covering the opening. The present invention also relates to a method of assembling such a vehicle door.

BACKGROUND

For example, Japanese Patent Laid-open Publication No. 2013-256184 discloses a door structure, in which an inner panel constituting a vehicle door has an opening and a hole cover member for covering the opening is fixed to the inner panel using a plurality of clips.

However, according to the door structure disclosed in JP 2013-256184 A, a lower end portion of the hole cover member is disposed on the inner side of the inner panel (closer to the cabin of the vehicle). This door structure may disadvantageously cause water or moisture flowing through the inner panel to flow through the surface of the hole cover member and enter between the inner panel and the lower end portion of the hole cover member.

Further, the door structure disclosed in JP 2013-256184 A includes an elastic sealing member interposed between the inner panel and the hole cover member. However, providing the elastic sealing member may result in an increased man-hour for the layout of the elastic sealing member, an increased number of parts because of the elastic sealing member, a decreased sealing performance of the elastic sealing member, or variations in quality of the elastic sealing member.

In view of the above, it is an object of the present invention to provide a door structure capable of suppressing entry of water or moisture from the opening of the inner panel into the inner side (cabin) of the vehicle. It is also an object of the present invention to provide a method of assembling such a vehicle door.

SUMMARY

To address the above problem, one aspect of the present invention provides a door structure comprising: an inner panel disposed closer to an inner side of a vehicle than an outer panel of a vehicle door and having an opening, and a cover member for covering the opening, wherein a peripheral edge portion of the cover member is disposed closer to an outer side of the vehicle than a peripheral edge portion of the opening and overlaps the peripheral edge portion of the opening of the inner panel in an interior-to-exterior direction of the vehicle while contacting the peripheral edge portion of the opening.

Further, another aspect of the present invention provides a method of assembling a vehicle door comprising the steps of: inserting a cover member from an inner side of a vehicle into an opening formed in an inner panel while holding a hold portion of the cover member; while holding the hold portion of the cover member, engaging a positioning claw portion provided on a lower portion of the cover member with a peripheral edge portion of the opening for positioning the cover member; while holding the hold portion, pulling the cover member toward the inner side of the vehicle to carry out a pulling and raising operation; and detachably fixing the cover member to the inner panel using the fixing member.

BRIEF DESCRIPTION OF THE DRAWINGS

The drawings described herein are for illustration purposes only and are not intended to limit the scope of the present invention in any way.

FIGS. 4A and 4B are enlarged perspective views of the vehicle door shown in FIG. 1, in which FIG. 4A shows a clip for fixing the cover member with respect to an opening of an inner panel, and FIG. 4B shows a positioning claw portion.

FIGS. 6A and 6B are sectional views illustrating a modified embodiment of the cover member, in which FIG. 6A shows a state before the clip is moved in the fixing position, and FIG. 6B shows a state after the clip is moved in the fixing position.

DETAILED DESCRIPTION

One embodiment of the present invention will be described in detail with reference to the accompanying drawings where appropriate. In the drawings, front and rear directions refer to corresponding directions in the longitudinal direction (i.e., front-rear direction) of a vehicle, right and left directions refer to corresponding directions in the vehicle width direction (i.e., lateral direction or right-left direction) of the vehicle, and upper and lower directions refer to corresponding directions in the vertical direction (i.e., upper-lower direction) of the vehicle.

Figure 3:
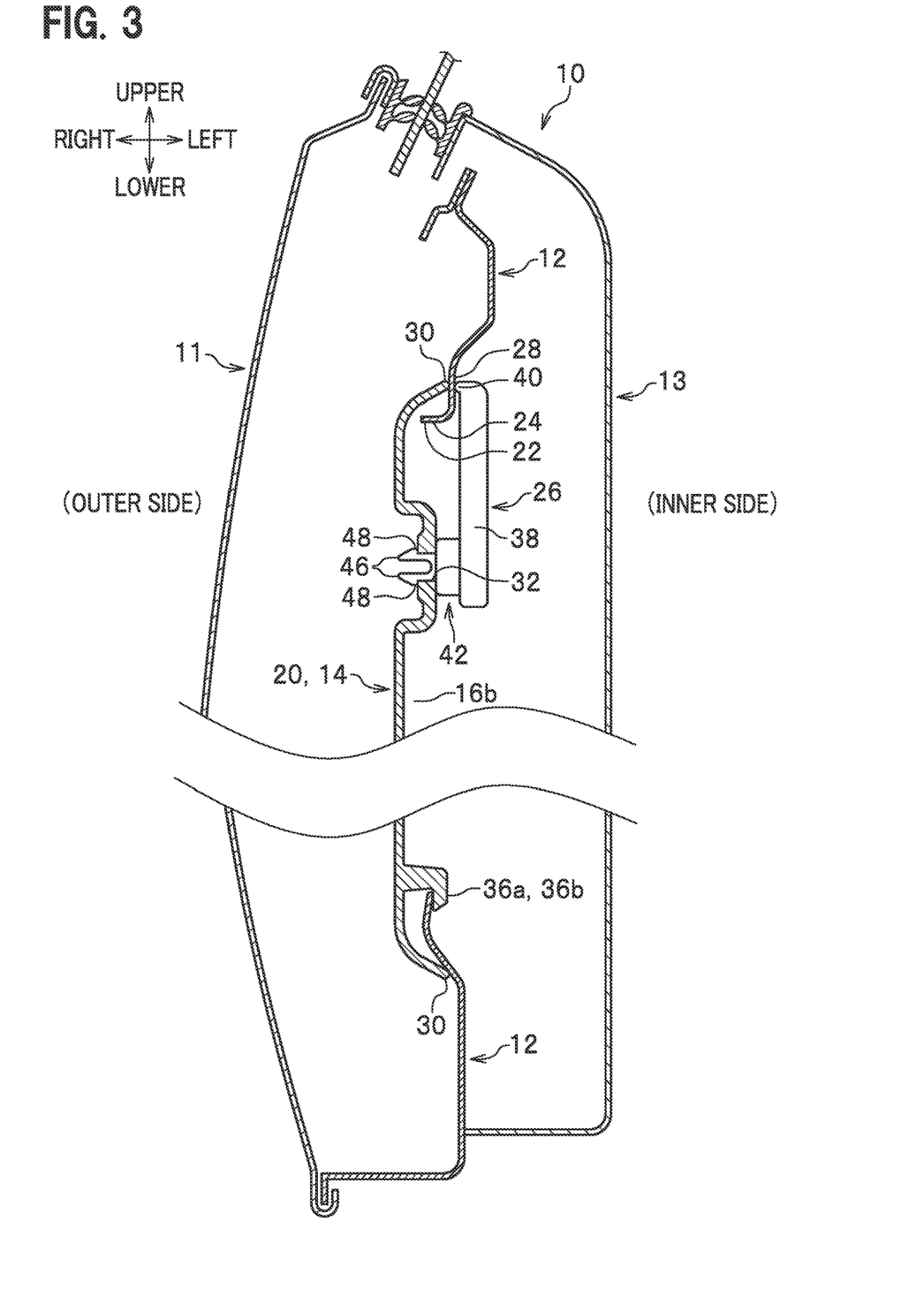
FIG. 3 is an enlarged, partially omitted, vertical section of the vehicle door shown in FIG. 1.

As seen in FIG. 3, a vehicle door 10 includes an outer panel 11 disposed closer to an exterior side (also referred to as an outer side) of the vehicle, an inner panel 12 disposed closer to an interior side (also referred to as an inner side) of the vehicle than the outer panel 11, and a door lining 13 for covering an inner surface (interior-side surface) of the inner panel 12.

Figure 1:
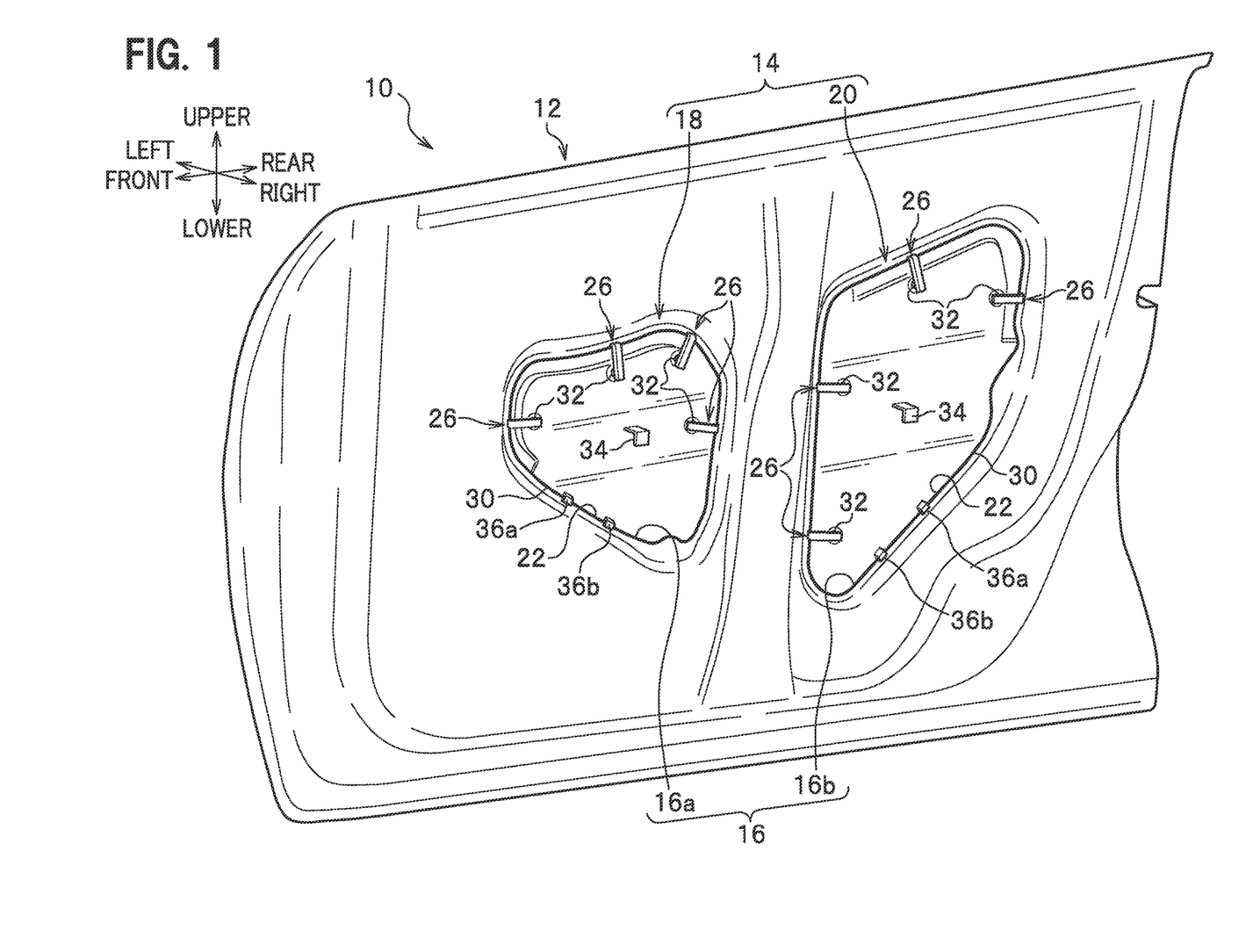
FIG. 1 is a schematic perspective view of a vehicle door to which a door structure according to one embodiment of the present invention has been applied.
Figure 7A:
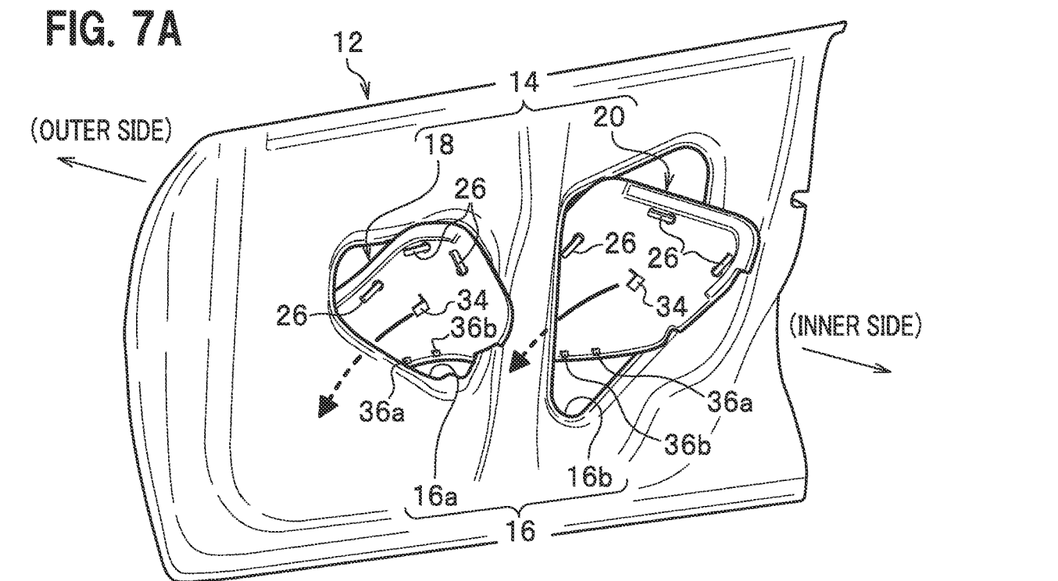
FIGS. 7A through 7C are diagrams illustrating a process of attaching the cover member to the inner panel with respect to the opening of the inner panel.

A cover member 14 is interposed between the inner side (front side) of the inner panel 12 and the outer side (back side) of the door lining 13. As seen in FIGS. 1 and 7A, the cover member 14 includes a front cover member 18 for covering and closing a front opening (opening) 16a formed in the inner panel 12, and a rear cover member 20 for covering and closing a rear opening (opening) 16b of the inner panel 12. The cover member 14 is formed, for example, of a plastic resin material. The front opening 16a and the rear opening 16b may be collectively referred to as an "opening 16" when they are not necessary to be distinguished.

The opening 16 is provided for the purpose of maintenance work for a window regulator mechanism (not shown), a door lock mechanism (not shown), a speaker unit (not shown), and the like. As seen in FIG. 1, a partition wall extending in the vertical direction (upper-lower direction) of the vehicle is disposed between the front opening 16a and the rear opening 16b that are arranged in the longitudinal direction (front-rear direction) of the vehicle.

A peripheral edge portion 22 that is bent toward the outer side of the vehicle (toward the outer panel 11) is provided around the front opening 16a and the rear opening 16b of the inner panel 12 (see FIG. 3). Further, a flange portion 24 is provided at the peripheral edge portion 22 of the inner panel 12 (see FIG. 3). The flange portion 24 protrudes from the peripheral edge portion 22 toward the outer side of the vehicle (toward the outer panel 11). Further, the inner panel 12 has a planar flat surface portion 28 (inner surface of the inner panel 12). The flat surface portion 28 is provided on the inner side of the inner panel 12 at an outer diameter side of the peripheral edge portion 22 (see FIGS. 4A and 3). The flat surface portion 28 has a shape corresponding to the outer shape of the front opening 16a and the outer shape of the rear opening 16b, and a distal end portion of a clip 26 (to be described later) is engageable with the flat surface portion 28.

The front cover member 18 and the rear cover member 20 are substantially the same in general configuration, although shapes thereof are different when viewed from the side. Therefore, the rear cover member 20 will be described in detail, and the description of the front cover member 18 will be omitted.

Figure 2:
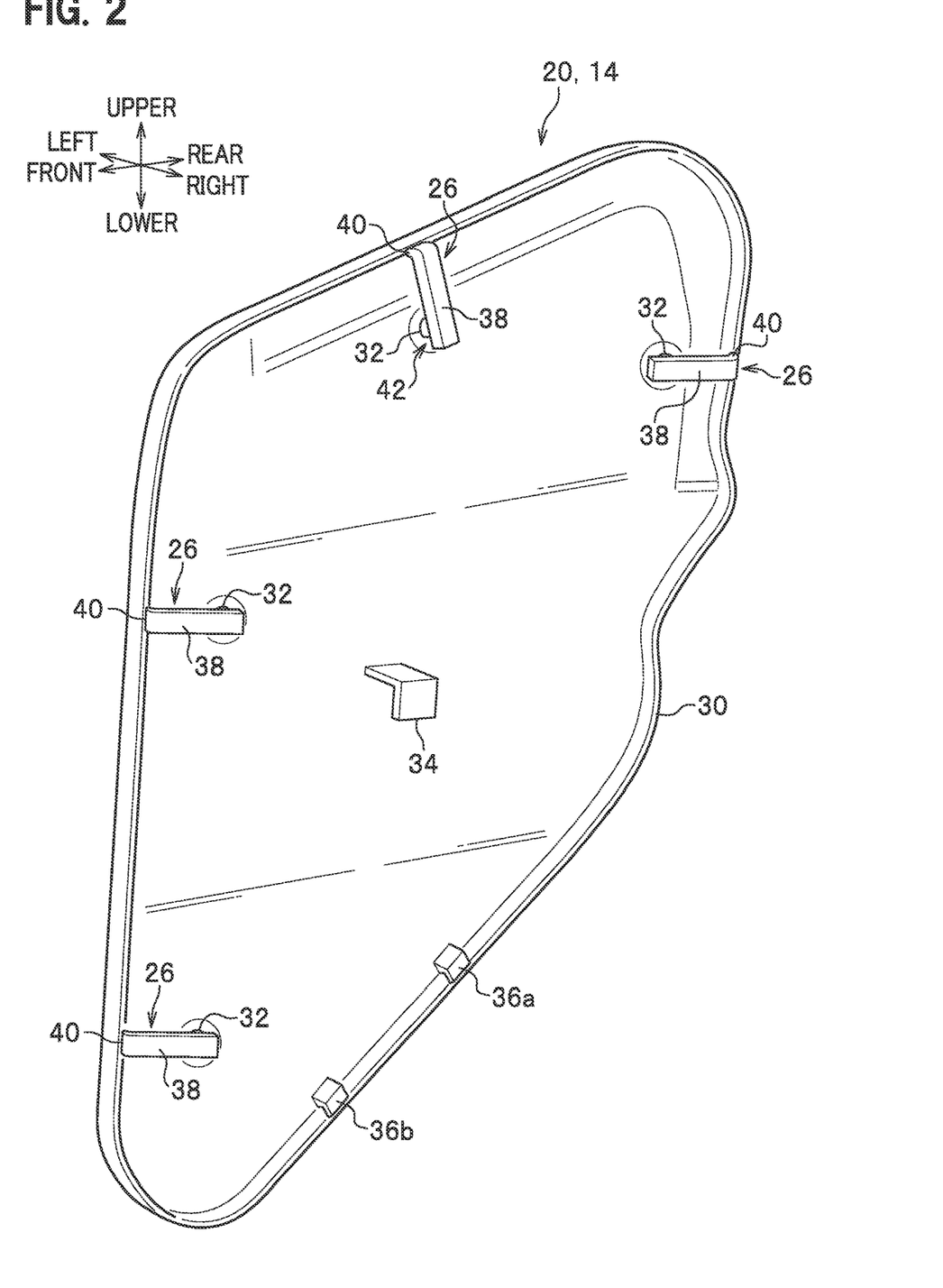
FIG. 2 is an enlarged perspective view of a rear cover member shown in FIG. 1.

As seen in FIG. 2, the rear cover member 20 has a peripheral edge portion 30 at its outer side. The peripheral edge portion 30 is generally trapezoidal in shape when viewed from side. As seen in FIG. 3, the peripheral edge portion 30 is located closer to the outer side of the vehicle than the peripheral edge portion 22 of the rear opening 16b of the inner panel 12, and the peripheral edge portion 30 overlaps the peripheral edge portion 22 of the inner panel 12 in an interior-to-exterior direction of the vehicle. Further, the peripheral edge portion 30 of the rear cover member 20 contacts the peripheral edge portion 22 of the inner panel 12.

As seen in FIG. 2, a plurality of clip mounting holes (holes) 32 are formed in an inner portion of the rear cover member 20, adjacent to the peripheral edge portion 22. The plurality of clip mounting holes 32 include a clip mounting hole formed in an upper central portion of the rear cover member 20 (located upward in the upper-lower direction and substantially in the middle in the front-rear direction of the rear cover member 30), a pair of clip mounting holes formed in the front side of the rear cover member 20 and spaced apart from each other in the upper-lower direction, and a clip mounting hole formed in the rear side of the rear cover member 20.

According to this embodiment, each of the front cover member 18 and the rear cover member 20 has four clip mounting holes 32. However, the present invention is not limited to this specific configuration. As seen in FIG. 1, the front cover member 18 has a clip mounting hole located at a front side thereof, a clip mounting hole located at an upper side thereof, and a pair of clip mounting holes located at a rear side thereof.

Provided substantially centrally on the inner surface of the rear cover member 20 is a hold portion 34 protruding laterally inward in the vehicle width direction (toward the door lining) (see FIG. 2). Providing the hold portion 34 allows an operator standing at the inner side of the vehicle to hold the hold portion 34 when the cover member 14 is attached to the inner panel 12 with respect to the opening 16 of the inner panel 12, so that he can attach the cover member 14 to the inner panel 12 with ease.

A plurality of positioning claw portions 36a, 36b are provided on a lower side of the rear cover member 20 (see FIGS. 1, 2, 4B, and 3). The positioning claw portions 36a, 36b are configured to position the rear cover member 20 in position with respect to the rear opening 16b. The positioning claw portions 36a, 36b include a positioning claw portion 36a disposed on an upper side of a lower oblique side of the rear cover member 20 (cover member 14), and a positioning claw portion 36b disposed on a lower side (lower than the positioning claw portion 36a) of the lower oblique side. Each of the positioning claw portions 36a, 36b is in the form of a hook having an L-shaped cross-section, and the distal end of the positioning claw portion 36a, 36b extends out toward the peripheral edge portion 30 of the cover member 14. The upper positioning claw portion 36a and the lower positioning claw portion 36b are spaced apart from each other in the longitudinal direction (front-rear direction) of the vehicle. According to this embodiment, since the plurality of positioning claw portions 36a, 36b are disposed on the lower portion of the cover member 14 (rear cover member 20) along the lower oblique side thereof, it is possible to improve the positioning accuracy of the cover member 14. Although a plurality of positioning claw portions 36a, 36b are provided in this embodiment, the present invention is not limited to this specific embodiment, and the cover member 14 may include a single positioning claw portion.

Figure 4A:
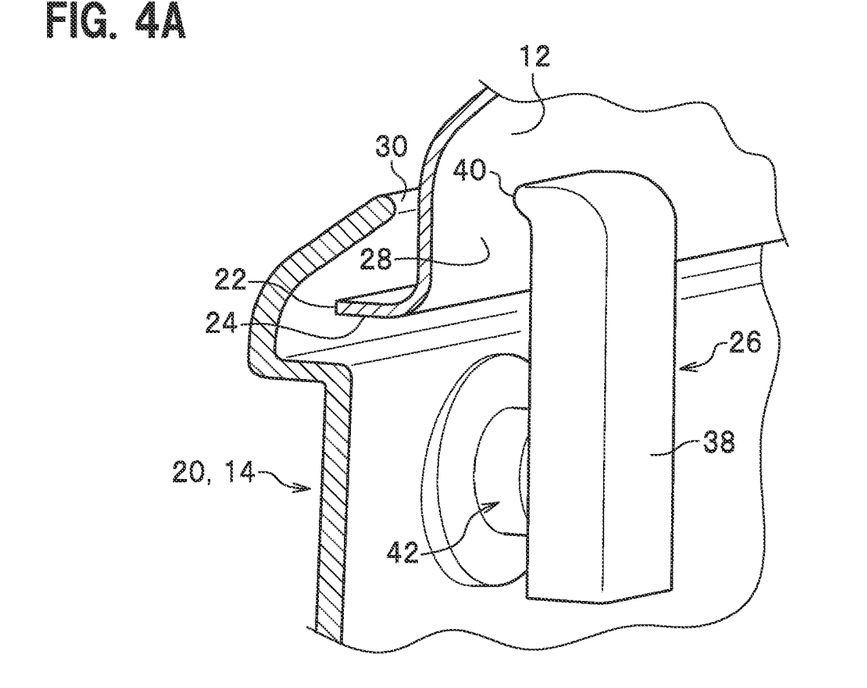
Figure 4B:
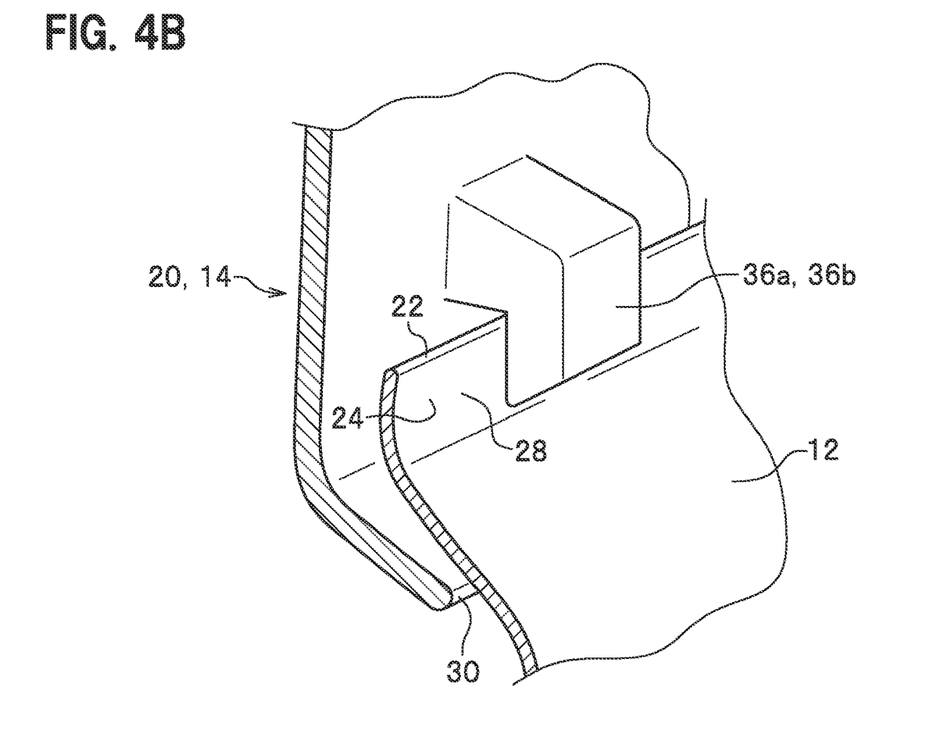

As seen in FIGS. 4A and 2, a plurality of clips (fixing members) 26 are provided on the inner side of the rear cover member 20. The clips 26 are mounted in the clip mounting holes 32 to removably attach (fix) the rear cover member 20 to the inner panel 12. As seen in FIG. 3, the clip 26 includes a clip body 38 having a columnar shape, an engagement portion 40 disposed on one end portion of the clip body 38 and configured to contact the flat surface portion 28 of the inner panel 12 to lock the clip body 38, and a rotary shaft portion 42 disposed on the other end portion of the clip body 38, opposite to the engagement portion 40, and rotatably mounted in the clip mounting hole 32.

Figure 7B:
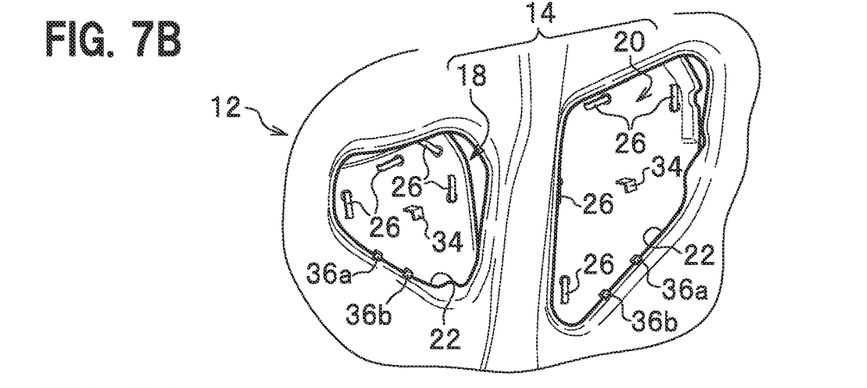
Figure 7C:
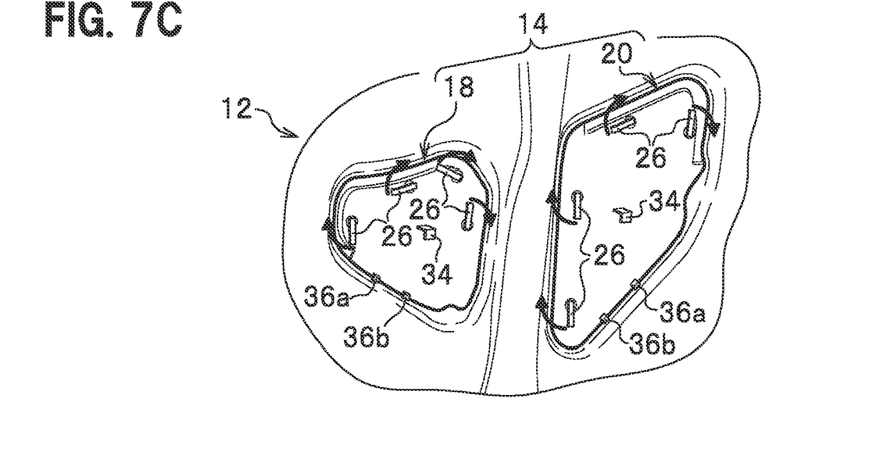

The clip body 38 and the engagement portion 40 of the clip 26 rotate along the flat surface portion 28 formed on the inner side of the inner panel 12 with the rotary shaft portion 42 serving as the center of rotation, so that they are movable between a fixing position and a non-fixing position (see FIG. 7C). It should be noted that the clip body 38 and the engagement portion 40 of the clip 26 serve as a fixing strip.

As seen in FIG. 3, a distal end portion of the rotary shaft 42 includes a plurality of claw strips 46 formed by a plurality of slits and configured to be elastically deformable in the radial direction, and a claw stopper portion 48 in the form of a stepped portion provided on the distal end side of the claw strips 46. When the rotary shaft portion 42 of the clip 26 is mounted in the clip mounting hole 32, the slits allow the plurality of claw strips 46 of the rotary shaft portion 42 to narrow to a small diameter, and the rotary shaft portion 42 is rotatably mounted in the clip mounting hole 32. Thereafter, the plurality of claw strips 46 widen to a large diameter and the claw stopper portion 48 is brought into contact with the peripheral portion of the clip mounting hole 32.

According to this embodiment, the clip 26 is shown as an example of a fixing member for detachably connecting the cover member 14 to the inner panel 12 at the inner side of the vehicle. However, the present invention is not limited to this specific configuration.

Figure 5A:
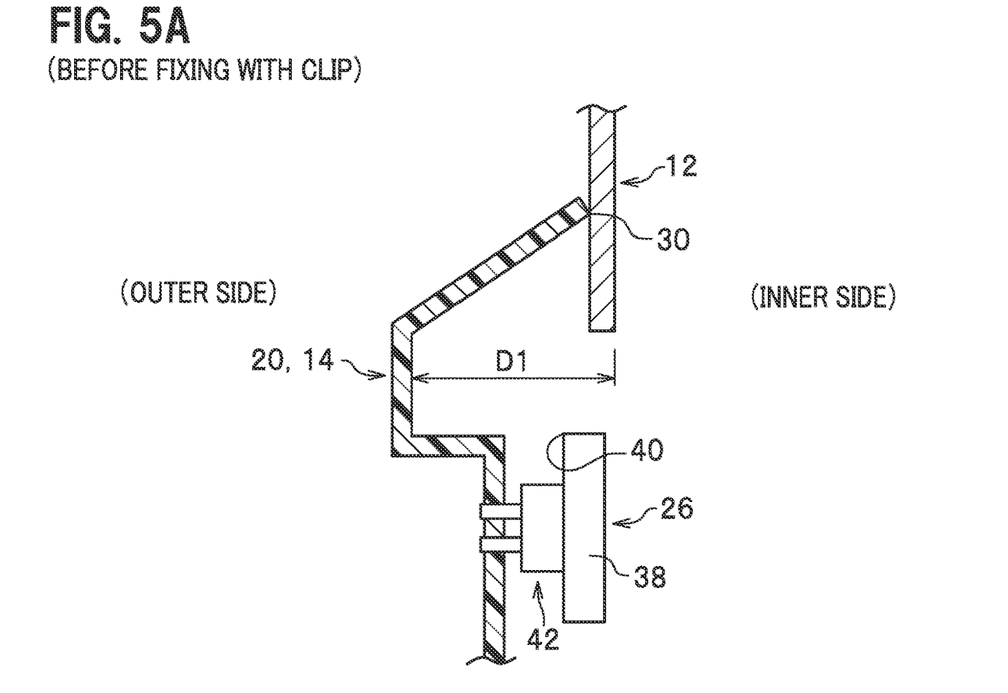
FIG. 5A is a schematic section showing a state before the clip is moved in a fixing position.
Figure 5B:
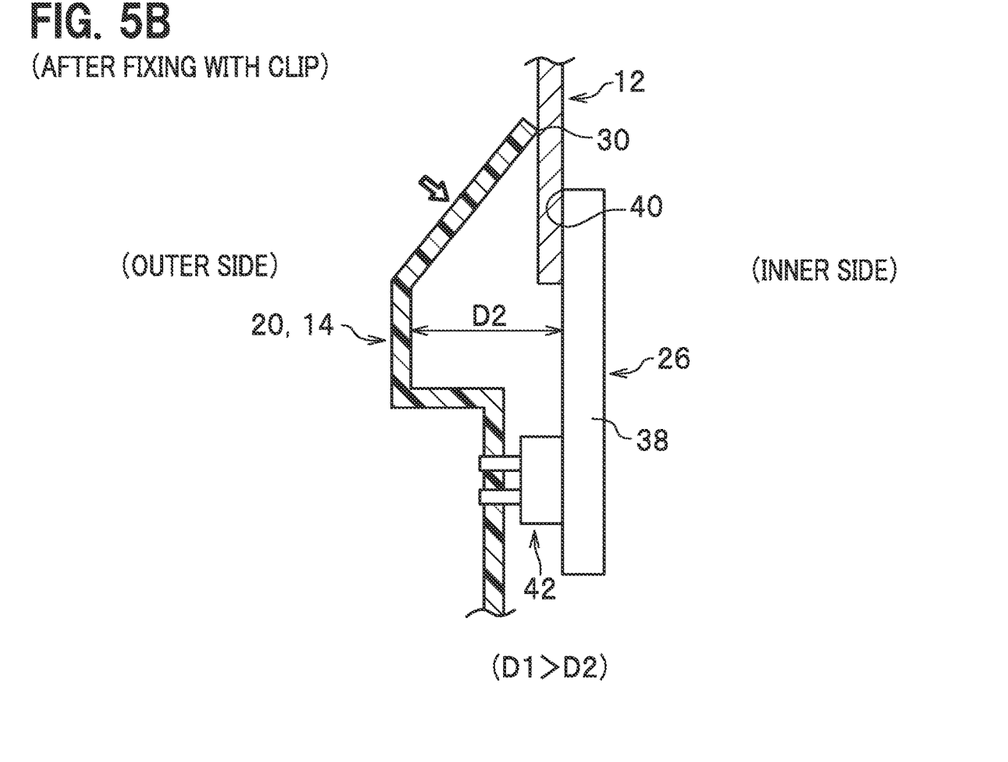
FIG. 5B is a schematic section showing a state after the clip is moved in the fixing position.

As seen in FIG. 5B, after the rear cover member 20 is fixed to the inner panel 12 using the clips 26, a distance between the outer surface of the clip 26 and the inner surface of the rear cover member 20 (cover member 14) that is parallel to the outer surface of the clip 26 in the horizontal direction is shown by a separation distance D2. Meanwhile, as seen in FIG. 5A, before the rear cover member 20 is fixed to the inner panel 12 using the clips 26, a distance between the inner surface of the inner panel 12 and the inner surface of the rear cover member 20 (cover member 14) that is parallel to the inner surface of the inner panel 12 in the horizontal direction is shown by a separation distance D1. The separation distance D2 between the outer surface of the clip 26 and the inner surface of the rear cover member 20 in the interior-to-exterior direction of the vehicle after the rear cover member 20 is fixed to the inner panel 12 using the clips 26 is shorter than the separation distance D1 between the inner surface of the inner panel 12 and the inner surface of the rear cover member 20 in the interior-to-exterior direction before the rear cover member 20 is fixed to the inner panel 12 using the clips 26 (i.e., D1>D2). This is because the peripheral edge portion 30 of the cover member 14 is elastically deformable toward the outer side of the vehicle when the cover member 14 is brought into contact with the inner panel 12. In other words, the peripheral edge portion 30 of the cover member 14 is elastically deformable to press the outer surface of the inner panel 12 (see the arrow shown in FIG. 5B).

Figure 6A:
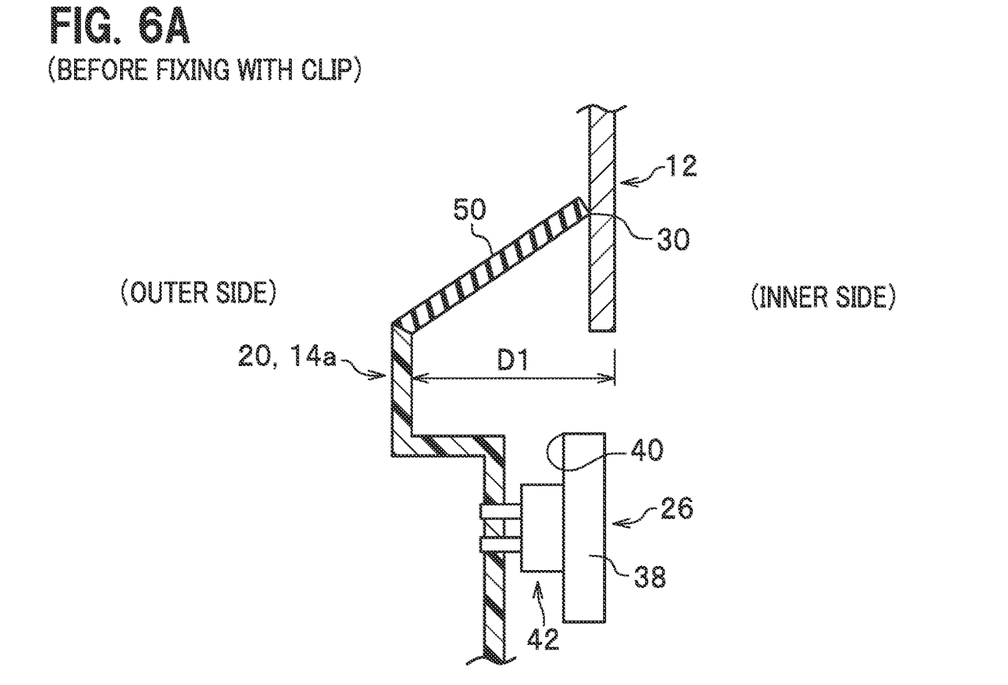
Figure 6B:
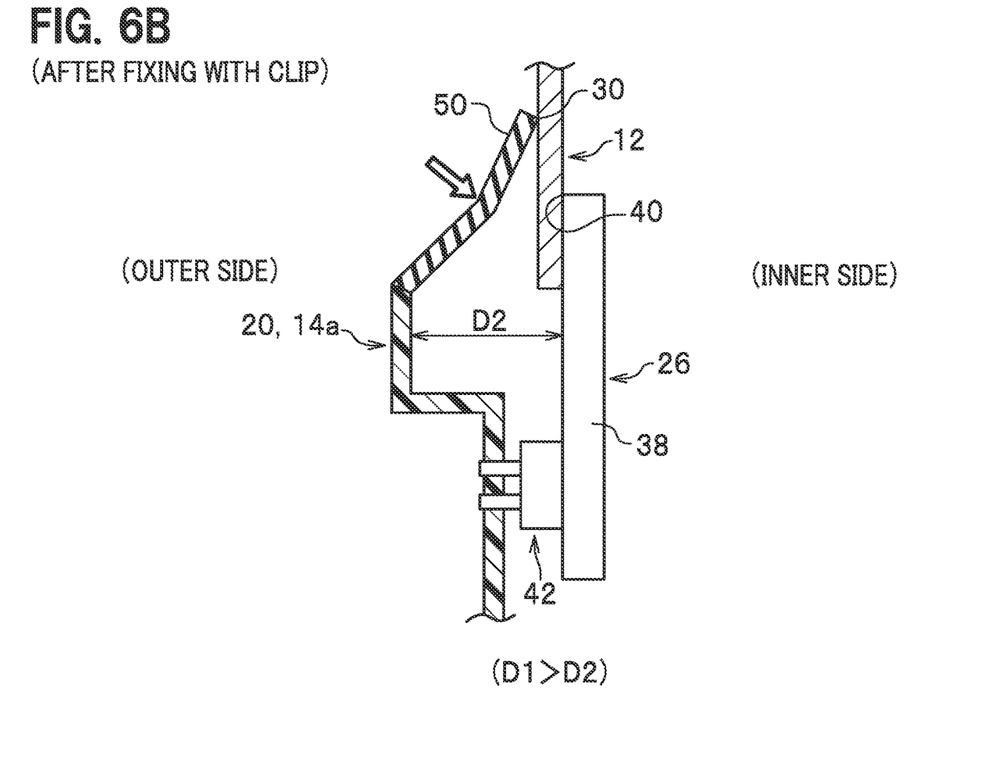

Next, a modified embodiment of the cover member 14 will be described. FIGS. 6A and 6B are sectional views illustrating a modified embodiment of the cover member, in which FIG. 6A shows a state before the clip is moved in the fixing position, and FIG. 6B shows a state after the clip is moved in the fixing position.

The cover member 14a according to this modification is configured such that the peripheral edge portion 30 of the cover member 14a is formed of an elastic member (e.g., rubber) 50 that is elastically deformable. The elastic member 50 is provided to be elastically deformable toward the outer side of the vehicle when the cover member 14a is brought into contact with the inner panel 12. In other words, the elastic member 50 is elastically deformable to press the outer surface of the inner panel 12 (see the arrow shown in FIG. 6B). According to this modified embodiment, since the peripheral edge portion 30 is formed of the elastic member 50, the elastic force of the peripheral edge portion 30 can be enhanced, so that the inner panel 12 and the cover member 14a overlap to each other and they can contact more tightly.

It should be noted that a part of the cover member 14 formed by plastic molding and the elastic member 50 may be integrally formed, for example, by a well-known two-color molding. As an alternative, after a part of the cover member 14 and the elastic member 50 are formed as separate members, they can be connected together, for example, using adhesive.

The vehicle door 10, to which the door structure according to this embodiment is applied, is basically configured as described above. The operation and advantageous effects of the vehicle door 10 will be described below.

According to this embodiment, the peripheral edge portion 30 of the cover member 14 contacts the peripheral edge portion 22 of the opening 16 of the inner panel 12 from the outer side of the vehicle, and the peripheral edge portion 30 is disposed closer to the outer side of the vehicle than the peripheral edge portion 22 of the opening 16. With this configuration, water flowing through the inner panel 12 flows down through the outer surface of the cover member 14. Accordingly, it is possible to prevent water flowing through the inner panel 12 from entering the inner side of the inner panel 12 (into the cabin of the vehicle). As a result, the door structure according to this embodiment can suppress entry of water or moisture from the opening 16 of the inner panel 12 into the inner side of the vehicle.

According to this embodiment, the cover member 14 includes clips (fixing members) 26 for detachably attaching (fixing) the cover member 14 to the inner panel 12 at the inner side of vehicle. These clips 26 can be mounted in the clip mounting holes 32 from the inner side of the vehicle, so that the clip-mounting operation can be easily performed from the inner side of the vehicle. As a result, the maintainability and the workability can be improved according to this embodiment. If the clips 26 are provided on the outer side of the cover member 14, the operator cannot reach the clips 26 from the inner side of the vehicle. In this instance, it is necessary to provide another different hole or the like to allow the operator to perform the attachment work of the clips 26, which leads to great difficulty in performing the attachment work.

According to this embodiment, the clip 26 has the rotary shaft portion 42 mounted in the clip mounting hole 32 of the cover member 14, and the clip body 38 and the engagement portion 40 configured to be rotatable around the rotary shaft portion 42 serving as the center of rotation. The clip body 38 and the engagement portion 40 are configured to rotate along the flat surface portion 28 formed on the inner side of the inner panel 12 with the rotary shaft portion 42 serving as the center of rotation, so that they move between the fixing position and the non-fixing position. With this configuration, since the clip body 38 and the engagement portion 40, which serve as a fixing strip, are rotatable along the flat surface portion 28 of the inner panel 12, it is possible to reduce the movable range of the clip body 38 and the engagement portion 40 in the thickness direction of the inner panel 12. This can effectively utilize a space between the inner panel 12 and the outer panel 11.

According to this embodiment, at least one of the clips 26 is provided on the upper portion of the cover member 14, and at least one of the positioning claw portions 36a, 36b is provided on the lower portion of the cover member 14 (two positioning claw portions 36a, 36b are provided on the lower portion in this embodiment). With this configuration, while the lower positioning claw portions 36a, 36b position the cover member 14 in position, the upper clip 26 makes the door structure waterproof. Further, it is not necessary to provide the clips 26 around the entire periphery of the peripheral edge portion 30 of the cover member 14, which leads to reduced man-hour.

Further, according to this embodiment, the cover member 14 has the inner surface located closer to the inner side of the vehicle, and the hold portion 34 configured to be held upon attaching the cover member 14 with respect to the opening 16 is provided on the inner surface of the cover member 14. With this configuration, when the cover member 14 is attached to the inner panel 12 with respect to the opening 16 of the inner panel 12, the operator holds and pulls the hold portion 34 toward the inner side of the vehicle, so that the cover member 14 is pulled and raised with ease. This pulling and raising operation will be described later in detail. The operator's holding and pulling the hold portion 34 makes it possible to cause the cover member 14 to more tightly contact the inner panel 12 with respect to the opening 16.

FIGS. 7A through 7C are diagrams illustrating a process of attaching the cover member to the inner panel with respect to the opening of the inner panel.

Next, with reference to FIGS. 7A to 7C, a description will be given to a process of attaching the cover member 14 to the inner panel 12 with respect to the opening 16 of the inner panel 12. It should be noted that the rotary shaft portion 42 of the clip 26 has been inserted into the clip mounting hole 32 of the cover member 14 but the clip 26 has not been moved to the fixing position. In other words, the clip 26 is kept in the non-fixing position at which the cover member 14 has not yet been fixed to the inner panel 12.

As seen in FIG. 7A, the operator inserts the cover member 14 into the opening 16 of the inner panel 12 from the inner side of the vehicle, while holding the hold portion 34 of the cover member 14. At this time, as shown by the solid arrows and the dashed arrows in FIG. 7A, the operator inclines the cover member 14 along a diagonal line of the opening 16, and then moves the cover member 14 from the inner side to the outer side of the vehicle. By this insertion process, the cover member 14 is located outside the inner panel 12 in the end. In FIG. 7A, the solid arrow indicates insertion of the cover member 14 located at the inner side and the dashed arrow indicates insertion of the cover member 14 located at the outer side.

Subsequently, as seen in FIG. 7B, while the operator holds the hold portion 34 of the cover member 14, he engages (hooks) the pair of positioning claw portions 36a, 36b provided on the lower portion of the cover member 14 with the peripheral edge portion 22 of the opening 16 to position the cover member 14 at a predetermined position.

After the cover member 14 is positioned at the predetermined position of the opening 16 using the pair of positioning claw portions 36a, 36b, the operator holds the hold portion 34 and further pulls the cover member 14 toward the inner side of the vehicle to carry out a pulling and raising operation. By this pulling and raising operation, the peripheral edge portion 30 of the cover member 14 and the peripheral edge portion 22 of the opening 16 can entirely, evenly and tightly contact with each other on the outer side of the inner panel 12.

Subsequently, as seen in the solid arrows of FIG. 7C, the operator turns (rotates) a clip 26 around its rotary shaft portion 42 serving as the center of rotation in the clockwise direction or the counterclockwise direction with the peripheral edge portion 30 of the cover member 14 and the peripheral edge portion 22 of the opening 16 being kept in tightly contact with each other. This can cause the engagement portion 40 of the clip 26 to engage with the flat surface portion 28 formed on the inner side of the inner panel 12. In a similar manner, the operator turns (rotates) all the clips 26 in the clockwise direction or the counterclockwise direction, so that the engagement portions 40 of the clips 26 engage with the flat surface portion 28 of the inner panel 12. As described above, the operator can in turn attach (fix) the front cover member 18 and the rear cover member 20 respectively with respect to the front opening 16a and the rear opening 16b (see FIG. 1). According to this embodiment, performing the above operation makes it possible to easily assemble the vehicle door 10 capable of suppressing entry of water or moisture from the opening 16 of the inner panel 12 into the inner side of the vehicle.

According to this embodiment, the separation distance (D2) between the clip 26 and the cover member 14 in the interior-to-exterior direction of the vehicle after the cover member 14 is fixed to the inner panel 12 using the clips 26 is shorter than the separation distance (D1) between the inner panel 12 and the cover member 14 in the interior-to-exterior direction before the cover member 14 is fixed to the inner panel 12 using the clips 26 (i.e., D1>D2). According to this embodiment, the clip body 38 and the engagement portion 40 of each clip 26 are turned (rotated) by a predetermined angle in the clockwise direction or the counterclockwise direction from the state in which the rotary shaft portions 42 of the clips 26 have been inserted into the clip mounting holes 32 but the operator has not turned (rotated) the clip body 38 and the engagement portion 40 of each clip 26, that is the sate before the cover member 14 is fixed by the clips 26 (i.e., the state in which the engagement portions 40 have not been engaged with the flat surface portion 28), so that the engagement portions 40 of the clips 26 are brought into engagement with the flat surface portion 28 formed on the inner side of the inner panel 12 and thus the cover member 14 can be reliably fixed to the inner panel 12 using the clips 26. As a result, according to this embodiment, the peripheral edge portion 30 of the cover member 14 and the peripheral edge portion 22 of the opening 16 can entirely, evenly and tightly contact with each other on the outer side of the inner panel 12.

As compared with the state before the cover member 14 is fixed using the clips 26, the separation distance between the inner panel 12 and the cover member 14 in the interior-to-exterior direction of the vehicle can be reduced after the cover member 14 is fixed using the clips 26. As a result, according to this embodiment, the inner panel 12 and the cover member 14 can contact more tightly with each other, to thereby suppress entry of water or moisture from the opening 16 of the inner panel 12 into the inner side of the vehicle.

What is claimed is:

1. A door structure for a vehicle comprising:
   an outer panel of a vehicle door for the vehicle;
   an inner panel disposed closer to an inner side of the vehicle than the outer panel and having an opening; and
   a cover member configured to cover the opening entirely from an outer side to close the opening,
   wherein a peripheral edge portion of the cover member tightly contacts a peripheral edge portion of the opening from the outer side,
   the cover member includes a plurality of fixing members configured to engage with the peripheral edge portion of the opening of the inner panel from the inner side to detachably fix the cover member to the inner panel, and
   when the plurality of fixing members are brought into engagement with the peripheral edge portion of the opening of the inner panel from the inner side, the peripheral edge portion of the cover member elastically deforms to press the peripheral edge portion of the opening from the outer side.

2. The door structure according to claim 1, wherein each of the plurality of fixing members has a rotary shaft portion mounted in a hole of the cover member, and a fixing strip rotatable around the rotary shaft portion serving as a center of rotation, and
   wherein the fixing strip is rotatable along an inner surface of the inner panel with the rotary shaft portion serving as the center of rotation, so that the fixing strip moves between a fixing position and a non-fixing position.

3. The door structure according to claim 1, wherein the cover member includes a positioning claw portion for positioning the cover member in position with respect to the opening, and wherein at least one of the plurality of fixing members is provided on an upper portion of the cover member, and the positioning claw portion is provided on a lower portion of the cover member.

4. The door structure according to claim 1, wherein the cover member has an inner surface located closer to the inner side of the vehicle, and a hold portion is provided on the inner surface of the cover member and located outside the inner panel during attachment of the cover member.

* * * * *